United States Patent [19]

Stradal

[11] 4,385,997
[45] May 31, 1983

[54] METHOD AND APPARATUS FOR PRECONDITIONING LAMINATED PAPER FOR RECYCLING

[75] Inventor: Milos Stradal, St. Foy, Canada

[73] Assignee: Reed Ltd., Toronto, Canada

[21] Appl. No.: 113,547

[22] Filed: Jan. 21, 1980

[51] Int. Cl.³ ............................................. D21C 5/02
[52] U.S. Cl. .................................... 210/784; 162/4; 209/452; 210/251
[58] Field of Search ............... 241/24, 28, 74, 82..3, 241/46 R, 200; 209/156, 452; 162/9.55, 59, 187, 194, 286, 4; 210/298, 297, 296

[56] References Cited

U.S. PATENT DOCUMENTS

| | | | |
|---|---|---|---|
| 2,298,016 | 10/1942 | Lincoln | 209/452 |
| 2,663,228 | 12/1953 | Serpas | 241/200 |
| 2,775,168 | 12/1956 | Baxter, Jr. | 241/46 R X |
| 3,188,942 | 6/1965 | Wandel | 241/74 X |
| 3,233,836 | 2/1966 | Merges | 241/74 X |
| 3,574,050 | 4/1971 | Rice | 162/55 X |
| 3,884,750 | 5/1975 | Iannazzi | 162/4 |
| 3,925,150 | 12/1975 | Marsh | 162/55 X |
| 4,159,242 | 6/1979 | Walker | 209/452 X |
| 4,225,427 | 9/1980 | Schnell | 162/55 X |

Primary Examiner—Frank A. Spear, Jr.
Attorney, Agent, or Firm—Leon Arthurs; Kenneth M. Garrett

[57] ABSTRACT

Disclosed is method and apparatus including a tank in which shredded corrugate is immersed and shuffled in a solvent fluid capable of attacking and weakening the adhesive bonding the core ply from the liner plies; said corrugate being advanced from its entry point into the tank to an exit point therefrom at a timed rate to limit its absorption of the solvent fluid prior to its transfer to delaminating apparatus.

9 Claims, 9 Drawing Figures

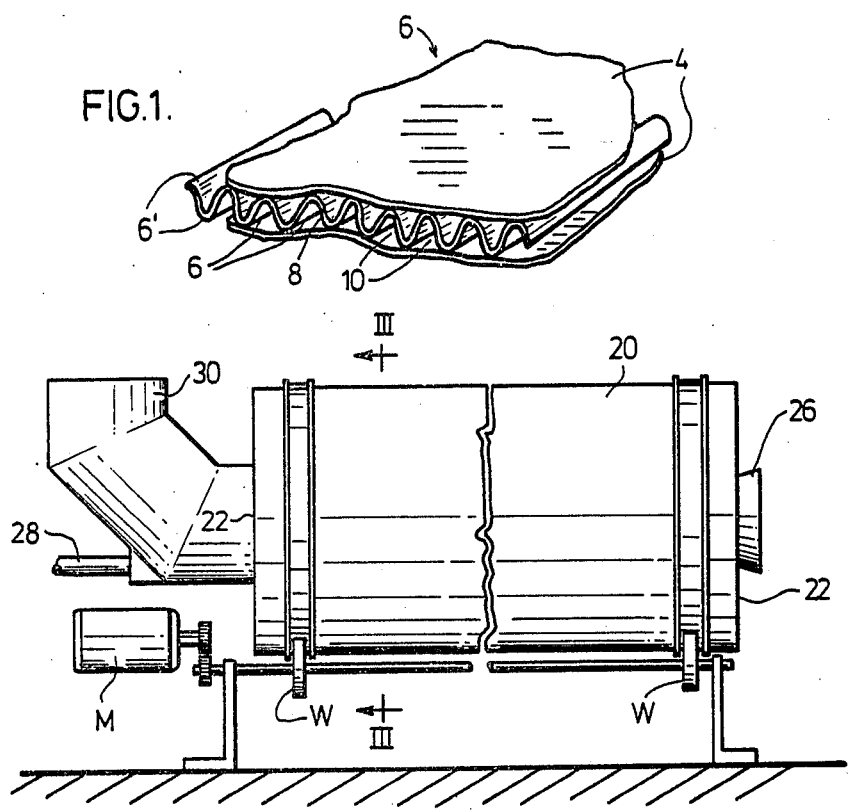
FIG.1.
FIG.2.
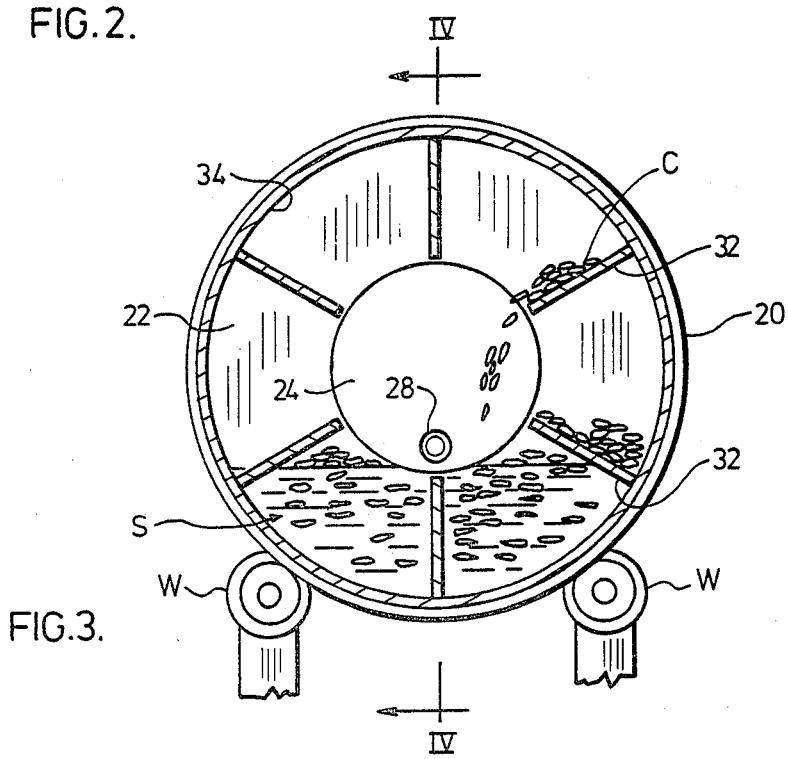
FIG.3.

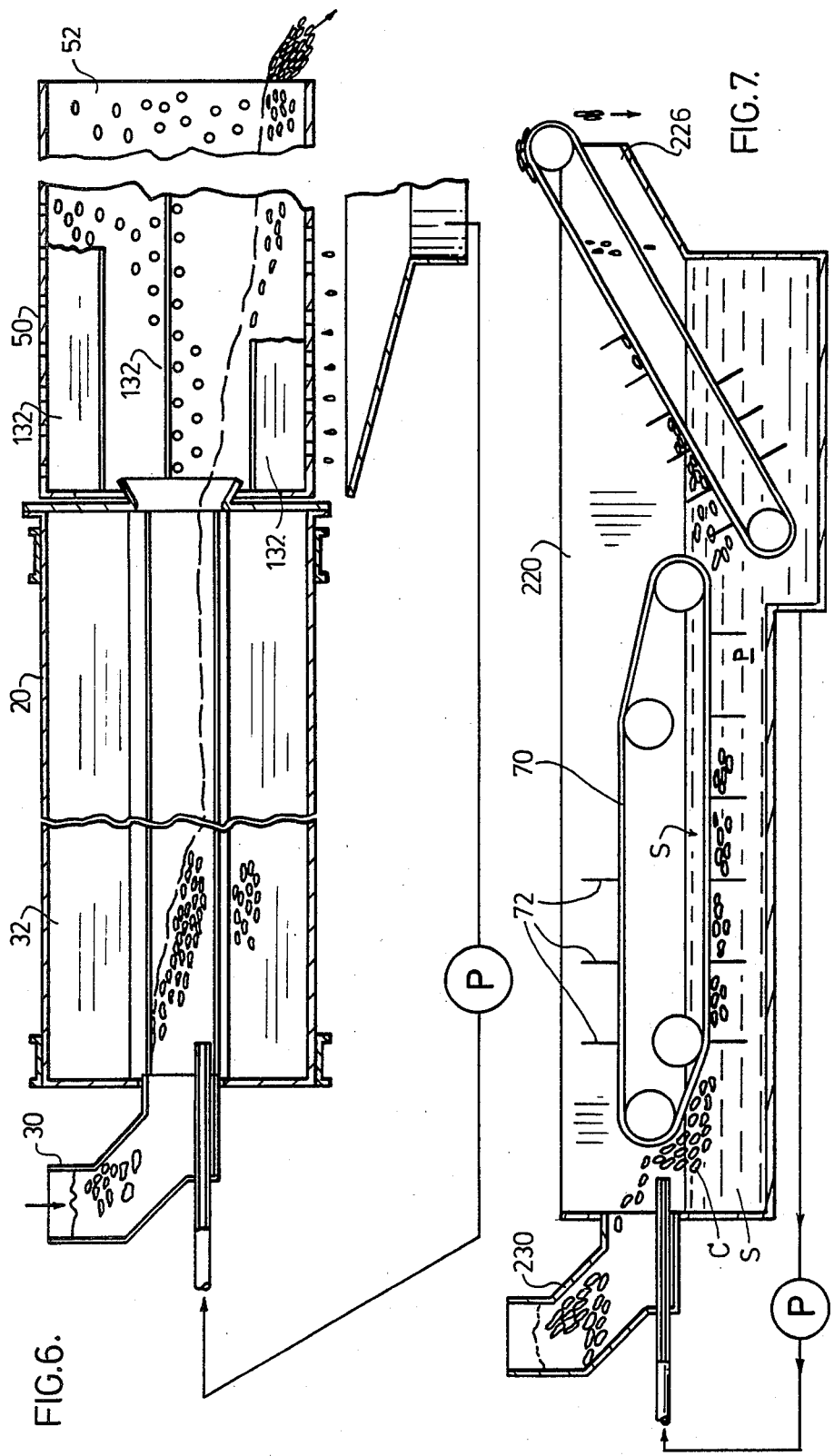

METHOD AND APPARATUS FOR PRECONDITIONING LAMINATED PAPER FOR RECYCLING

The invention relates to method and means for conditioning corrugate paper bond preliminary to its separation or delamination into its respective constituents for recycling.

BACKGROUND OF THE INVENTION

It is now well known that significant economic advantages may be gained from the recycling of paper waste, (including corrugate) and if the waste to be recycled—i.e. the "furnish"—is comprised of mixed papers, it is further known that such economic advantages may be enhanced, often to a considerable extent, by sorting the various papers comprising the furnish according to their respective qualitative categories insofar and to the extent it is feasible and possible to do so preliminary to the actual recycling thereof.

This expedient avoids or minimizes admixture of various paper grades in any one recycling operation which would usually relegate the recovered product to a relatively inferior and, hence, cheaper re-use. Conversely, pre-sorting of the paper makes it possible for the better grades to be separated and recycled separately from the lesser grades and, hence, thereafter used in superior and resultantly more valuable applications.

RELATED APPLICATION

Machinery for sorting waste papers in known and one such machine is disclosed in U.S. Pat. No. 4,124,168, issued to the Assignee of the present Applicant. Such machinery is, however, most useful in the sorting of uncomplicated papers and is largely ineffective in the sorting of laminated papers of differing qualities which may required to be delaminated prior to the actual sorting operation.

FIELD OF THE INVENTION

The laminated paper product of present concern is corrugate paper board, often simply termed "corrugate", which is used quite extensively, for example, in shipping boxes or containers.

In its commonest form, corrugate comprises a core ply or medium which is formed of stiff, crush-resistant, paper which is fluted or rippled providing it with upper and lower crests and is substantially receptive to water. This core ply is sandwiched between plies of linerboard or liners, so-called, of another paper grade, normally less receptive to water and tightly bonded to the crests of the core ply, usually by a starchy adhesive.

Recycling the corrugate in its original composite or laminated form and without prior delamination would yield a product comprising a mixture of the core ply material and the linerboard material; such product being usually of relatively low value and useful only in, so called, "low-end" applications. Conversely, separate recycling of the liner board on the one hand and the core ply on the other, after delamination of the board, will upgrade the potential uses and, hence, the value of each of the recovered products; conceivably, even imparting to the core ply, which is the cheaper component, a greater value at times than that of the waste corrugate as a whole.

The separation of its constituents being thus shown to be desirable, the corrugate is subjected to pre-conditioning treatment to undermine, at least, the adhesive bonds between its several plies whereby to facilitate the ultimate rupture of the bonds and, hence, the separation of the respective plies in an ensuing sorting operation thus conducing to the subsequent segregation of the paper grades from each other in the actual recycling operation.

DESCRIPTION OF THE PRIOR ART

The only prior patent known to the Applicant having specific relevance to the delamination of corrugate is that issued to IANNAZZI—U.S. Pat. No. 3,833,460 in the United States in which is described a so-called "dry" technique; the present invention being contradistinctively describable as involving a "wet" technique.

SUMMARY OF THE INVENTION

Theoretically, delamination of corrugate may be accomplished by soaking the boad in a suitable "solvent-"—e.g. water—with or without additives and, while possibly effective to achieve delamination, indiscriminate soaking is not commercially practicable or feasible for several reasons. For example, it presents a problem in harvesting the respective delaminated plies. The plies would be soaked through, hence, less manageable for sorting purposes and, of course, prone to disintegration and premature repulping before segregation; thus defeating, at least partly, the purpose of the delamination and pre-conditioning operations.

It should be emphasized that the word "solvent" and its variations is used rather loosely herein for want of better terminology to define a substance which is able to attack and weaken or undermine adhesive which bind together the several laminae of the corrugate whether or not by actually dissolving the adhesive. Starch, for example, is a very common adhesive in corrugate and while not truly soluble in water—which is the preferred "solvent" for starchy bonds—it is certainly susceptible thereto and capable of absorbing the water; becoming spongy and inclined to lose its adhesive tenacity in consequence.

Recognizing the desirability in many circumstances of initiating delamination of the corrugate by soaking and so softening the adhesive bonds uniting its plies, the invention seeks, broadly, to provide method and means for achieving this result without seriously risking or conducing to wholesale premature repulping of the corrugate.

As a further and important object, the invention seeks to provide method and means for pre-conditioning corrugate for recycling by controlled exposure thereof to a solvent capable of attacking the adhesive bonds to weaken them and thereby render them susceptible to other forces subsequently applied to the corrugate to complete the actual delamination thereof and, at the same time, to separate its respective plies from each other for recycling.

More specifically, the invention seeks to provide method and means for undermining the adhesive bonds as aforesaid by introducing the corrugate into a suitable solvent as herein defined and by simultaneously applying mechanical forces to the corrugate to procure maximum exposure of its adhesive bonds to the solvent whereby to attack the bonds and effectively weaken them before the paper components of the corrugate absorb too much of the solvent and begin repulping.

The invention achieves its foregoing objectives by the provision of method and means for introducing the corrugate duly cleaned and shredded (as hereinafter described) into fluid solvent—for example, a water bath; shuffling the corrugate therein promoting flushing of the solvent between its outer plies or liners and otherwise conducing to exposure of the adhesive bonds to the solvent; maintaining the shuffling of the corrugate for a brief period of time sufficient in duration to enable the solvent to reach, attack, soften and undermine said adhesive bonds but insufficient to initiate active repulping of the corrugate; withdrawing the corrugate from the bath aforesaid, draining it of free solvent, before subjecting it virtually immediately thereafter to stresses in sorting apparatus rupturing said softened bonds and separating the respective plies of the corrugate while at the same time segregating or isolating them from each other for subsequent re-cycling.

For a better understanding of the invention at this juncture it is deemed useful to observe that the corrugate furnish is usually provided in, so-called "shredded" form, i.e.—chopped-up fragments rarely exceeding 100 sq. inches in plane dimension and with the corrugate core plies thereof usually crushed in consequence of having been previously compressed by a baling press into a tightly compacted bale; yielding fragments or shreds as aforesaid of diverse sizes, profiles and conditions when the bale is unbound.

It is further noteworthy that, despite any cleaning necessary for the removal of contraries or the like entrained in the furnish, the components of the corrugate may still remain somewhat impure in comparison to their original virginal state owing to various "treatments" which the latter may have undergone in and for its original use whereby it may have been loaded with relatively irremovable contaminants such as coatings, adhesives, printing materials and the like.

Moreover, while the invention has proven most effective in enabling adequate separation of the several plies of the corrugate with minimal effort and with minimal premature repulping, some incidental repulping is virtually inescapable which also tends to degrade the recycled products in comparison to their virginal state. Finally, it should be noted that, while highly desirable, totally "clean" delamination is not alway feasible for a variety of reasons which may stem from the composition of the respective plies; from the specific adhesives used for their lamination; from coatings and the like specifically applied to one or more of the plies, and so forth.

A selected embodiment of the invention exemplary of its elements, parts and principles will now be described with reference to the accompanying drawings wherein:

BRIEF DESCRIPTION OF THE DRAWINGS

FIG. 1—is an isometric view of a fragment or shred of a common form of corrugate;

FIG. 2—a schematic, side elevational view of apparatus according to the invention;

FIG. 3—a section along the line III—III of FIG. 2;

FIG. 6—a view corresponding to FIG. 4 with a drainage attachment;

FIG. 7—a longitudinal sectional view in schematic form of apparatus alternative to that shown in FIG. 5;

DESCRIPTION OF THE PREFERRED EMBODIMENT

Figure 4:
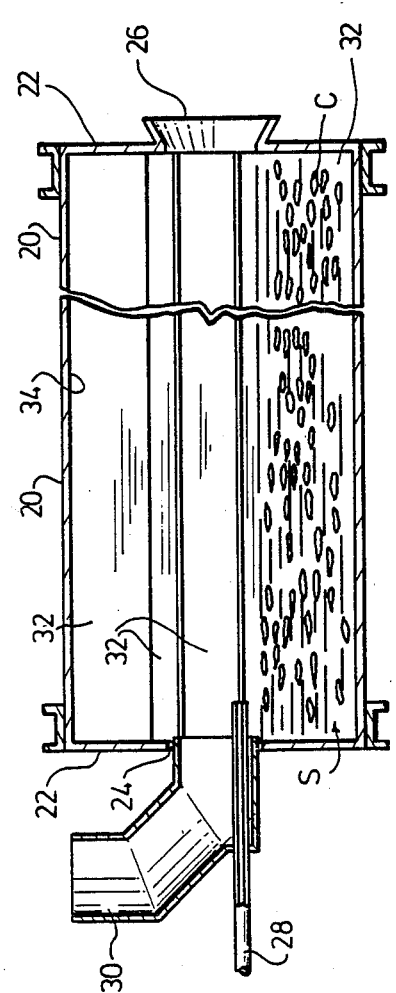
FIG. 4—a longitudinal section of the apparatus of FIG. 2 along the line IV—IV of FIG. 3.

It need scarcely be pointed out that the drawings are presented in schematic form in the interest of clarity and for the sake of better comprehension of the inventive concepts as distinguished from the manner in which the illustrated apparatus would be engineered for industrial or commercial purposes.

In the following description of the invention method and apparatus aspects thereof have been intermingled for better comprehension whereby the method will sometimes be obvious from the description of the apparatus which will, in turn, be sometimes better apparent from the described method.

Keeping in mind the wide variations therein which are not only possible but reasonably common, the corrugate C selected for the purpose of this description is visualized as the simple, familiar, variety in which the core ply 2 is commonly formed of semi-chemical fibres and is laminated to linerboard skins or liners 4—4 of unbleached kraft fibre by a starchy, water-susceptible adhesive forming bonds 6 at which the liners 4—4 contact and are secured to the crests 6' of the corrugations 8.

In the normal, uncrushed state of the corrugate C, its corrugations 8 provide flutes or channels 10 through which bonds 6 can readily be reached by fluid in which it is immersed. Commonly, however, the corrugations 8 will be crushed in the baling of the furnish and, while that may well restrict access to the bonds 6, the general disruption of the corrugate C, which is also a concommitant of baling, will tend to increase its exposure or receptivity to the solvent and thus compensate to a greater or lesser degree for the constrictions resulting from the collapse of the channels 10.

It having already been explained that the core ply 2 is more readily saturable than the liners 4—4, the invention seeks to concentrate upon maximum wetting of the bonds 6 within the least time whereby to minimize soaking of the liners 4—4 and, hence, so to retard the repulping thereof.

Thus, the invention visualizes the introduction of precleaned corrugate C, in its shredded form, into a solvent fluid to be more particularly described and of shuffling the corrugate in the solvent to flex it, tilt it, reorient it, tumble it and generally move it around not only to expose new areas thereof to the solvent, but also to gain maximum accessability of the adhesive bonds 6 thereto.

One convenient and very simple expedient for carrying out this step is to provide the solvent in an elongated, axially horizontal container such as a tank, shown for example in FIG. 2 and other views of the drawings. A tank as aforesaid may be constituted by the tubular, rotatable, drum 20 shown in FIG. 2 and other views, which is provided with bulkheads 22—22 at its ends; there being central apertures 24-26 in the bulkheads 22—22 for the introduction and removal of corrugate C into and out of drum 20.

Said drum 20 is intended to provide an environment in which the corrugate C may be conveniently bathed in the solvent fluid whose nature and character depend necessarily on and are most appropriate to the specific adhesive used in the lamination of the particular corrugate C under treatment.

As previously stated, common starch is a very popular adhesive used for this purpose and is also susceptible to an aqueous solvent which tends to soften it and diminish its adhesive tenacity. As is well known, the effects of such aqueous solvent on the starch may, of course, be enhanced under certain conditions by the admixture therewith of a wetting agent such as, for example, urea or poly alkoxylated alkyl phenol available on the market under the trademark TRITON X-100.

Thus, in the present embodiment, the solvent fluid S contained in drum 20 between its bulkheads 22—22 consists of water (with or without additives) which is replenishable from time to time when required as at 28 through an aperture aforesaid in one of the bulkheads 22 or into fill chute 30, if preferred.

It should be re-emphasized at this juncture, that the effectiveness of the present process is dependent upon several factors to a greater or lesser degree according to the specific corrugate C being pre-conditioned.

Thus, not only should the solvent S utilized be that most appropriate to the adhesive used in the lamination of the corrugate C but, in addition, the temperature thereof may also be varied according to prevailing conditions as may be the exposure of the corrugate C thereto—i.e. its residence time in the solvent.

Other factors may also be relevant e.g. the shred size; the vigor of the shuffling, and so forth. However, these parameters are not quite as important as the solvent, its temperature, and the residence time.

In the present example, fill chute 30 is disposed to empty into drum 20 through aperture 24 in one of the bulkheads 22; this being the entry point for the shredded corrugate C into drum 20; the exit point thereof being the discharge aperture 26 in the opposite bulkhead 22.

The residence time of the corrugate C is that spent in its transit from its point of entry to the point of its exit from drum 20 and recourse may, of course, be had to various expedients for advancing the corrugate C between these two points.

For example, the residence time may be governed by the rate at which the corrugate C is introduced into drum 20 as well as the rate of rotation of the latter as will appear.

As will be apparent from FIG. 6 corrugate C fed rapidly into drum 20 tends to pile up adjacent aperture 24 where it is first dropped by fill chute 30. However, the pile up understandably tends to level off as drum 20 is rotated whereby several other beneficial results are collaterally achieved.

That is to say, rotation of the drum 20 will tend to carry and lift the lowermost layers of corrugate C out of the fluid solvent bath at the bottom of drum 20 and drop them again on top of the pile thereby making room for the upper strata of the pile to be accomodated and immersed in the solvent substantially as shown in FIG. 3.

Likewise, the rotation will shuffle and reorient the corrugate shreds exposing new surfaces thereof to the solvent and will move them about to promote flushing of the solvent S through the channels 10 of core ply 2. Thus, in general, the rotation of drum 20 will have the effect of shuffling the corrugate C contained therein to impart to it a variety of movements such as flexing, tilting, tumbling, up-setting and so forth causing the solvent to flush back and forth in channels 10 and thereby maximize its access to the adhesive bonds 6.

The shuffling of corrugate C as well as its advancement within drum 20 may also be enhanced or achieved entirely by lengthwise disposition of spaced apart fins or vanes 32 on its interior walls 34 so as to be co-rotatable therewith. As will be obvious, corrugate C in drum 20 will be periodically lifted by the rotating vanes 32 and dropped back thus constantly shuffling and re-shuffling it. Moreover, a somewhat diagonal or spiral inclination of vanes 32 on drum walls 34 in an appropriate orientation will co-incidentally procure the required advancement of corrugate C while it is being shuffled as aforesaid (not illustrated).

Accordingly, all corrugate C introduced into rotating drum 20 will ultimately be duly immersed in the solvent fluid S contained therein as and while it is being advanced from the point of its entry to the point of its exit from drum 20.

The rotation of drum 20 will therefore be seen to serve as an effective expedient not only for enhancing exposure of corrugate C to the solvent fluid S but also for procuring its advance between the two points aforesaid. However, while quite effective for these purposes a rotatable drum is not the only expedient available for shuffling the corrugate C and advancing it in a bath of solvent fluid S.

Figure 5:
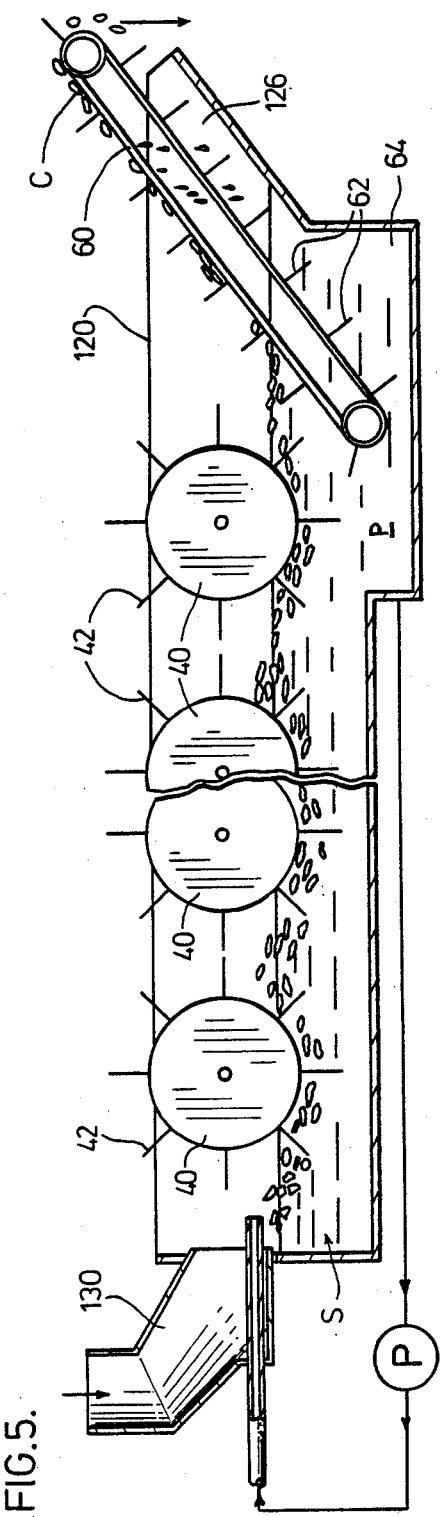
FIG. 5—a longitudinal sectional view in schematic form of apparatus alternative to that shown in FIG'S. 2, 3 and 4 of the drawing.

That is to say, equivalent purposes may be served by the relay system illustrated schematically in FIG. 5 of the drawing which is shown as comprising a non-rotatable tank 120 for a pool P of solvent and a train of communicating paddle wheels 40 installed therein to extend between fill chute 130 and the point of exit 126 from tank 120. In a manner which will be quite obvious, the entering corrugate C is received by the first paddle wheel 40 in the train and is relayed by it to the next and so on until it reaches exit point 126. In this embodiment, the paddles 42 of each said paddle wheel are carried through an arcuate path which lies partly in the pool P contained in tank 120 whereby said corrugate C is not only constantly re-shuffled but is, from time to time immersed and re-immersed in the solvent as it is being received and relayed as aforesaid.

The structures illustrated and described disclose various expedients whereby corrugate C may be shuffled and advanced in a bath of solvent in order to provide access of the solvent to the bonds 6 joining the liners 4—4 to the core plies 2 of shreds of corrugate C and to control the residence time; it being appreciated that the residence is also variable according to the distance to be traversed by the corrugate between its points of entry and exit as well as by the speed of the specific advancing mechanisms.

Usually, any free solvent S or most of it remaining trapped in channels 10 of core ply 2 will be drained therefrom in the course of such incidental stirring as the corrugate C may receive in its removal from the solvent S and its transfer to delaminating and sorting apparatus. However, positive drainage may be achieved by subjecting the corrugate C to a mechanical draining treatment such as rotating cage 50 which is shown in schematic section in FIG. 6 of the drawing in receiving relation to drum 20.

Said cage 50 may or may not be equipped with vanes 132 corresponding to vanes 32 in drum 20; the cage being broken in FIG. 6 with the respective portions thereof shown as vaned and unvaned.

Cage 50 may be rotated to shuffle the corrugate C deivered thereto by the soaking apparatus; the free solvent being drained therefrom during such shuffling while the corrugate moves in cage 50 from the discharge end of drum 20 to the output end 52 of cage 50.

An alternate expedient for drainage is represented by the bucket chain transport 60 mounting scoops 62 and positioned at the exit end of tank 120 to scoop corrugate C from the last paddle wheel 40 in the train and to carry it upwardly out of the fluid solvent S to a point outboard of tank 120 and there to drop it; the fluid solvent S entrained in the corrugate C being allowed to drain back through the bucket chain transport 60 either into tank 120 or into sump 64 where it may be collected and re-circulated.

The dredging device 70 in tank 220 (FIG. 7) may, in appropriate circumstances, substitute for the paddle wheel train of FIG. 5 being similarly equipped with paddles 72 to which corrugate C is delivered by fill chute 230 and by which it is then pushed through fluid solvent S both in tank 220 to the exit end 226.

Although perhaps not as vigorous as the rotating drum 20 or the relay system of FIG. 5, the bucket chain transport 60 in FIG'S. 5 and 7 and dredge device 70 in FIG. 7 will nevertheless stir the corrugate C in its transit through and out of tanks 120 and 220 to a degree more or less sufficient to achieve the objects of the invention depending on various factors such as the average size of the corrugate shreds.

Motor M shown in FIG. 2 drives wheels W which rotate drum 20 and may also power the mobile structures of FIG'S. 5 and 7. Either said motor M or the transmissions (not shown) normally and conventionally associated therewith or may be regulatable to govern the speed of the equipment and so to control the residence time of the corrugate C in solvent S.

Certain operating parameters relating to the conditioning of corrugate were investigated under model conditions using the following test procedure:

Single wall corrugate board (basis weight 42-26-42) adhered with a starch base adhesive was cut into strips 150 mm perpendicular to flute channels by 15 mm. The strips were immersed in the conditioning solvent for a given time and delaminated on an Instron Tester within 1½ min. of recovery from the solvent. The resistance to delamination was measured as an average force required to rupture the bond between the crests of the medium and linerboard. Each value represents testing of at least five strips and 8-10 readings per strip. Moisture content of strips was determined immediately after testing by oven drying. "Control" conditions are defined as employing as the conditioning solvent water at 20° C. with no additive thereto.

Figure 8:
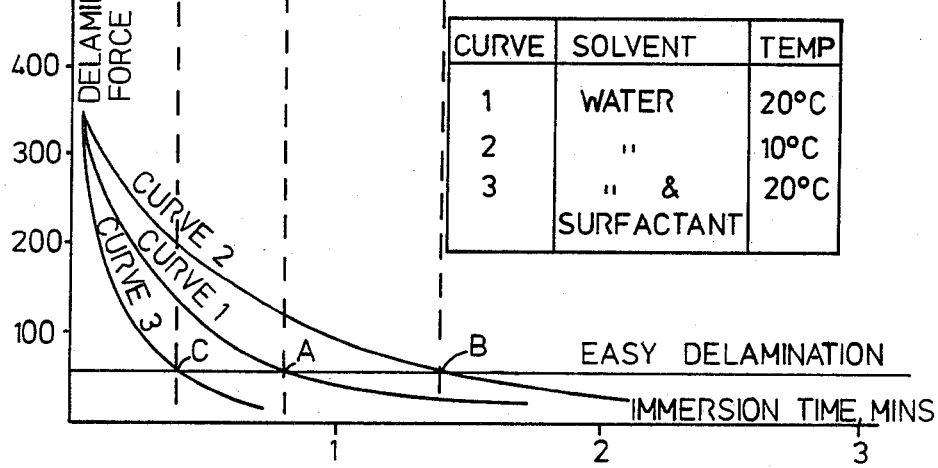
FIG. 8—shows in graphic form the amount of water pick up and the ease of separation of corrugate as a function of time, and FIG. 9—shows the effects of various operating parameters on the time of easy separation of corrugate, also in graphic form.

Values for the resistance to delamination of corrugate under various treatment conditions are shown in FIG. 8. With reference thereto, curve 1 shows the variation of the resistance to delamination as a function of time under control treatment conditions. At zero time, the resistance to delamination considerably exceeds the strength of the individual laminae comprising the corrugate, and tearing of the laminae takes place. "Easy delamination" is considered to occur when the resistance drops to an arbitrary value of 60 grams in the above described test procedure, as conditioned corrugate will normally be subject to a force of at least this magnitude in subsequent fibre classifying apparatus. Under control conditions of treatment, easy delamination occurs after some 50 seconds of immersion (Point A).

Figure 9:
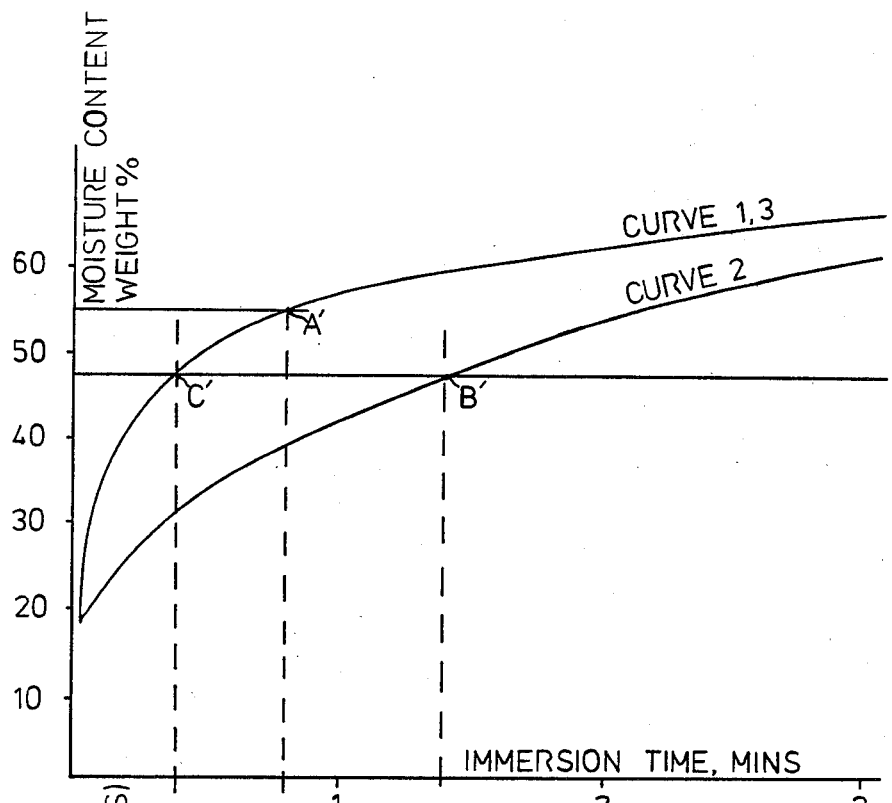

The moisture content of the conditioned corrugate is shown in FIG. 9. Under standard conditions it may be seen that the moisture content increases moderately rapidly over the time period at about which easy delamination is reached (Curve 1, Point A'). Although not shown in the accompanying data, it will be appreciated that the wet strength of the individual laminae decreases both as the water content thereof increases and also as a function of time. Under control conditions it is found that the wet strength of the laminae may approach zero, as evidenced by the disintegration of the laminae, after about 5 minutes immersion. There is then a differential between the time required for "easy delamination" and that which disintegration of the corrugate laminae occurs.

In practice this differential may be increased by removing the corrugate from the treatment bath prior to the time at which easy delamination occurs. Solvent entrained with the corrugate continues to attack the adhesive bond between the laminae and reduce the resistance to delamination. Part of the entrained solvent will drain from the corrugate by the described means provided for this purpose. A portion thereof will be imbibed into the corrugate to increase the moisture content thereof and thus to decrease the wet strength thereof. However, whilst the resistance to delamination is quickly reduced to below the easy delamination value, the quantity of solvent available for imbibition may generally be controlled so as to be less than that which will completely saturate the laminae and lead to their disintegration.

The time differential may also be affected by the temperature of operation of the conditioning bath and the solvent employed. In FIGS. 8 and 9 values obtained where the temperature of operation is reduced to 10° C. are shown as curve 2. Predictably, the time for easy delamination was increased, a value of 1.3 minutes being obtained (Point B) (FIG. 9). Surprisingly, the moisture content of the corrugate at the time for easy separation (Point B') (FIG. 8) was significantly less than that which obtains for the control, pointing to an increased time differential. It may also be remarked that it is advantageous to reduce the amount of solvent passing into the fibre classifying apparatus with which the instant conditioning apparatus will generally be employed.

The control conditions were further varied by using as solvent water containing 0.004% by volume of a non-ionic surfactant (Triton X-100, trademark for a poly alkoxylated alkyl phenol), whilst maintaining the temperature of the bath at 20° C. The values obtained are shown in FIGS. 8 and 9 in curve 3. The time for easy separation was reduced, (Point C) in comparison to the control. Whilst the rate of moisture pick up of the corrugate essentially duplicated that found for the control, the moisture content of the corrugate at easy separation time (Point C') was significantly lower than that for the control, again pointing to an increased time differential.

The foregoing being the best form of the invention presently known to the inventors, it is by no means inconceivable that means other than those specifically enumerated may be resorted for carrying out the inventive concepts described without departing from the true scope of the invention as defined in the following claims.

I claim:

1. Process for pre-conditioning corrugate for delamination to separate its corrugate core ply from the liner plies to which it is joined by adhesive bonds, comprising the steps of:

introducing corrugate in shredded form into a tank containing a pool of solvent fluid capable of undermining said adhesive bonds and advancing the corrugate within the tank through said pool from a point of entry to a point of exit therefrom;

shuffling the corrugate while it is in transit between said points of entry and exit to promote penetration of the solvent fluid between said liner plies and access thereof to said adhesive bonds;

timing the transit as aforesaid to allow adequate undermining of said adhesive bonds with minimal absorption of said solvent fluid by the respective plies of said corrugate, and of thereafter, removing the corrugate from said pool of solvent fluid at said point of exit of said tank prior to any significant size reduction of the plies, draining excess solvent fluid therefrom and transferring it to apparatus for delaminating it while said adhesive bonds are undermined.

2. Process as set forth in claim 1 wherein the tank is rotated to shuffle the corrugate.

3. Process as set forth in claim 2 wherein the corrugate is piled at the time and point of its entry into the tank for advancement to the point of exit therefrom by rotation of the tank.

4. Process as set forth in claim 3 wherein the tank is rotated about its axis and the corrugate is delivered into a cage at the point of its exit from the tank; said cage being rotated to shuffle the corrugate and drain it of free solvent fluid prior to its transfer to the delaminating apparatus.

5. Process as set forth in claim 1 wherein the corrugate is relayed through said tank between its points of entry and exit.

6. Process as set forth in claim 1 wherein the corrugate is propelled through the pool to advance it as aforesaid.

7. Process as set forth in claim 1 wherein the corrugate is moved in a direction inclined to the vertical to drain it of free solvent fluid.

8. Process as set forth in claim 7 wherein the corrugate is scooped from the pool at the point of exit aforesaid and removed from the tank in an upwardly inclined direction to a point located externally of the tank.

9. Process as set forth in claim 1 wherein the corrugate is rotated in a cage to drain it.

* * * * *